United States Patent [19]

Pirnie, Jr. et al.

[11] 3,780,227

[45] Dec. 18, 1973

[54] TELEPHONE CALL ANSWERING AND ALLOTTING TRANSFER SYSTEM

[75] Inventors: Robert M. Pirnie, Jr.; Robert M. Pirnie, III, both of Montgomery, Ala.

[73] Assignee: Communication Equipment & Contracting Co., Inc.

[22] Filed: Feb. 22, 1972

[21] Appl. No.: 227,736

[52] U.S. Cl. .............................. 179/6 C, 179/27 D

[51] Int. Cl. .............................. H04m 1/64

[58] Field of Search .................... 179/6 C, 6 F, 6 R

[56] References Cited

UNITED STATES PATENTS

| | | | |
|---|---|---|---|
| 1,208,566 | 12/1916 | Johnson | 179/6 C |
| 2,998,489 | 8/1961 | Riesz | 179/6 C |
| 3,190,961 | 6/1965 | Fitzpatrick | 179/6 C |

*Primary Examiner*—Raymond F. Cardillo, Jr.
*Attorney*—Wilkinson, Mawhinney and Theibault

[57] ABSTRACT

The present disclosure is directed to a telephone call answering system where a customer installation has a plurality of incoming trunk lines and a plurality of operator serviced position circuits in which incoming calls are directed to available operator positions through a trunk and position preference and selector circuit which is actuated by a calling trunk circuit. If all operator positions are busy after a predetermined time, a timer connects a recorded announcement machine into the calling circuit to advise the calling trunk that all positions are busy and to await an operator. The first free operator is automatically connected to any calling trunk.

2 Claims, 13 Drawing Figures

PATENTED DEC 18 1973

3,780,227

SHEET 06 OF 12

PATENTED DEC 18 1973 3,780,227

SHEET 07 OF 12

TELEPHONE CALL ANSWERING AND ALLOTTING TRANSFER SYSTEM

An object of the present invention is the provision of a rapid switching system to connect individually a plurality of incoming trunk lines to a plurality of operator positions in sequence of calling order, should all of said positions be busy to then actuate a recorded announcement machine which will inform the incoming caller to hold until a position becomes available.

Another object of the present invention is to provide a trunk and position preference and selector which will control the switching of the incoming call on the trunk to the operator position automatically without human intervention.

A further object of the present invention is to provide a modular switching unit which may be used with a plurality of trunk lines and operator positions to automatically control the switching of incoming calls on trunk lines to operator positions and if such positions are all busy to connect the trunk to a recorded announcement which will advise the incoming caller to hold until an operator can service his call.

A still furhter object of the invention is the provision of a call waiting counter in circuit with all trunk lines to digitally indicate the number of unanswered calls.

A further object of the invention is the provision of a trunk identifier for indicating to an operator at an operator position which of a plurality of trunks is the calling trunk.

Another object of the present invention is the provision of a position group busy circuit in a system of the character described herein which is selectively placed in circuit with each position group and trunk and position preference and selector circuit to control the number of groups to receive incoming calls.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
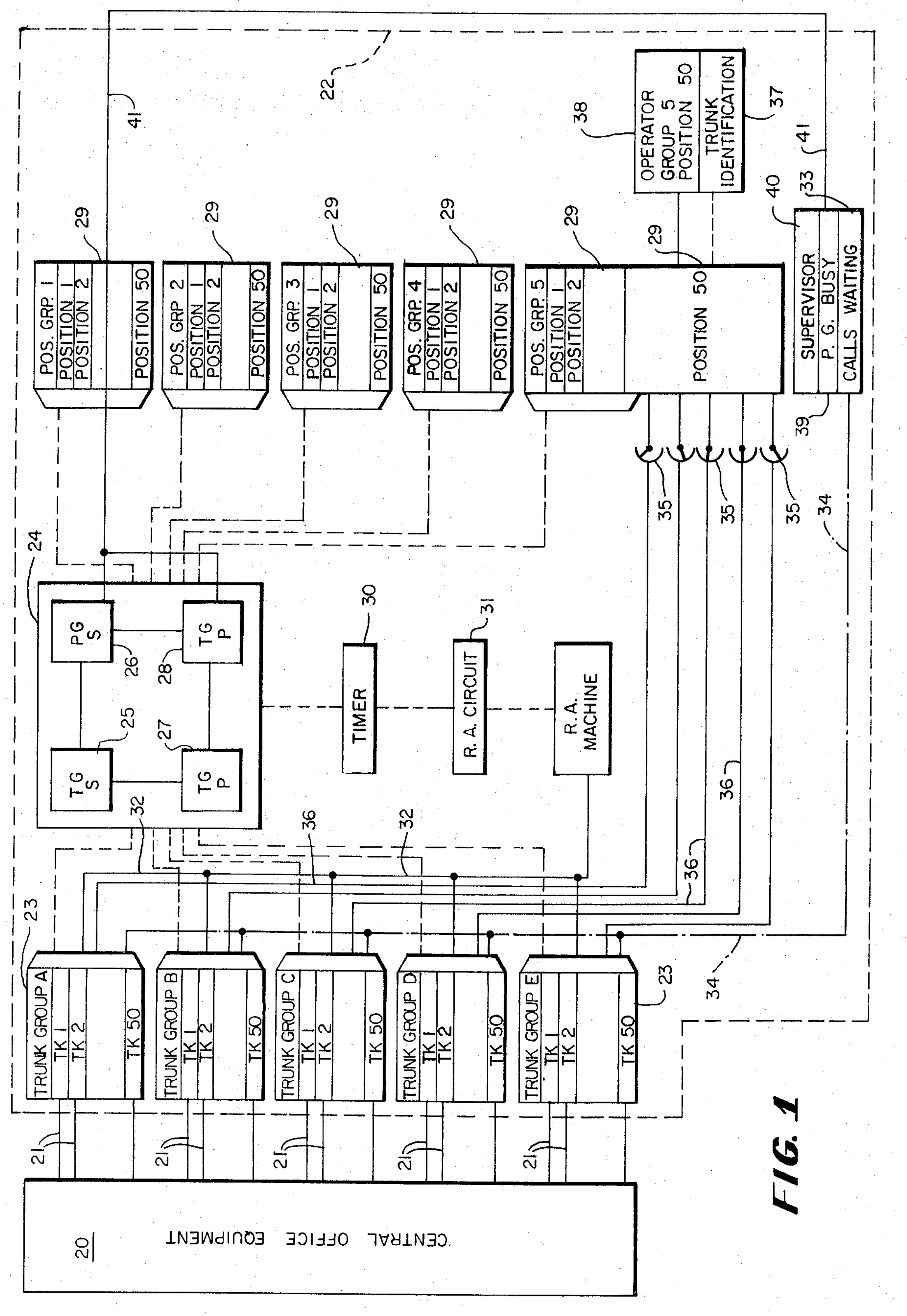
FIG. 1 is a diagrammatic schematic of the call answering and position allotting transfer system of the present invention.

Referring now to the drawings and more particularly to FIG. 1, 20 designates a telephone central office from which a plurality of trunk lines 21 issue to a customer installation 22 which contains a plurality of customers trunk circuit groups 23, each group of which are connected to a control circuit unit 24 which has trunk and position preference and selectors 25, 26, 27, 28 which are connected in circuit with a plurality of position groups 29 each of which has a plurality of operator positions, and connected to a timer 30 in circuit with a recorded announcement machine circuit 31 which in turn is connected to each group of incoming trunks 23 to advise the incoming caller to hold until an operator position can service his call. The recorded announcement machine circuit 31 is connected to each group of trunk circuit groups 23 by lines 32.

The call waiting digital read out counter 33 is in circuit with each trunk circuit group 23 over lines 34.

Looking now to the position group 5, position 50 of position groups 29, shown in lower right of FIG. 1, position 50 has five trunk scanners 35 each of which are connected over lines 36 to the trunk groups 23 to indicate which trunk of a trunk group has the incoming call and to establish the voice path between the two. The trunk calling will be visually identified on a read out device 37. This unit is at the operators position 38.

When desired all positions of a position group 29 may be rendered busy to block out incoming calls to direct incoming calls to a specific group or groups during low load hours. This busy unit 39, at supervisors position 40 is connected to the position group selector 26 over line 41.

Referring now to the drawings, FIGS. 2 through 12 one detailed embodimant of the invention will be now be in detailed circuitry.

REFERRING TO FIG. 2 — TRUNK NO. 2

Call arrives from selector level on leads 1TS201, 1RS201 and 1SS201. The 1SS201 lead feeds a ground from the selector level to the S relay and the S relay operates.

The incoming call is across the 1TS201 and 1RS201 leads. This completes the operate path for the BF relay which now operates.

The ST relay operate path is now completed through BF contact 1 and PTC normally made Contact 9. The ST relay operates.

IN FIG. 9

The TSFA Key is wired so as to provide a −48 volts simultaneously to the 1AB108 and 1BB108 leads. This −48 volts on the 1AS108 and 1BB108 leads is sent to FIG. 1—Trunk circuits 1 and 2. In Trunk Circuit 2 the −48 volts from 1AB108 goes through ST contact 3 and PTC normally made contact 2 to the 1STA05 lead.

IN FIG. 6

A ground supplied to the ER relay (normally operated) holding it operated is broken when the PAR relay operates. The ground is run through normally made contacts 1 and 2 on the PAR relay through normally made contacts 1 and 2 on the PBR relay through normally made contacts 1 and 2 on the PCR relay through normally made contacts 1 and 2 on the PDR relay through normally made contacts 1 and 2 on the PER relay to the ER relay coil. When any of the PAR-PER relays operate, the ER relay releases, so the ER relay now releases.

The PAR-PER and the PAA-PEA relays operate depending on which trunk the call is in. The PAR and PAA relays operate for Group A of the trunks, the PBR and PBA for Group B of the trunks, the PCR and PCA for Group C of the trunks, etc.

Figure 6:
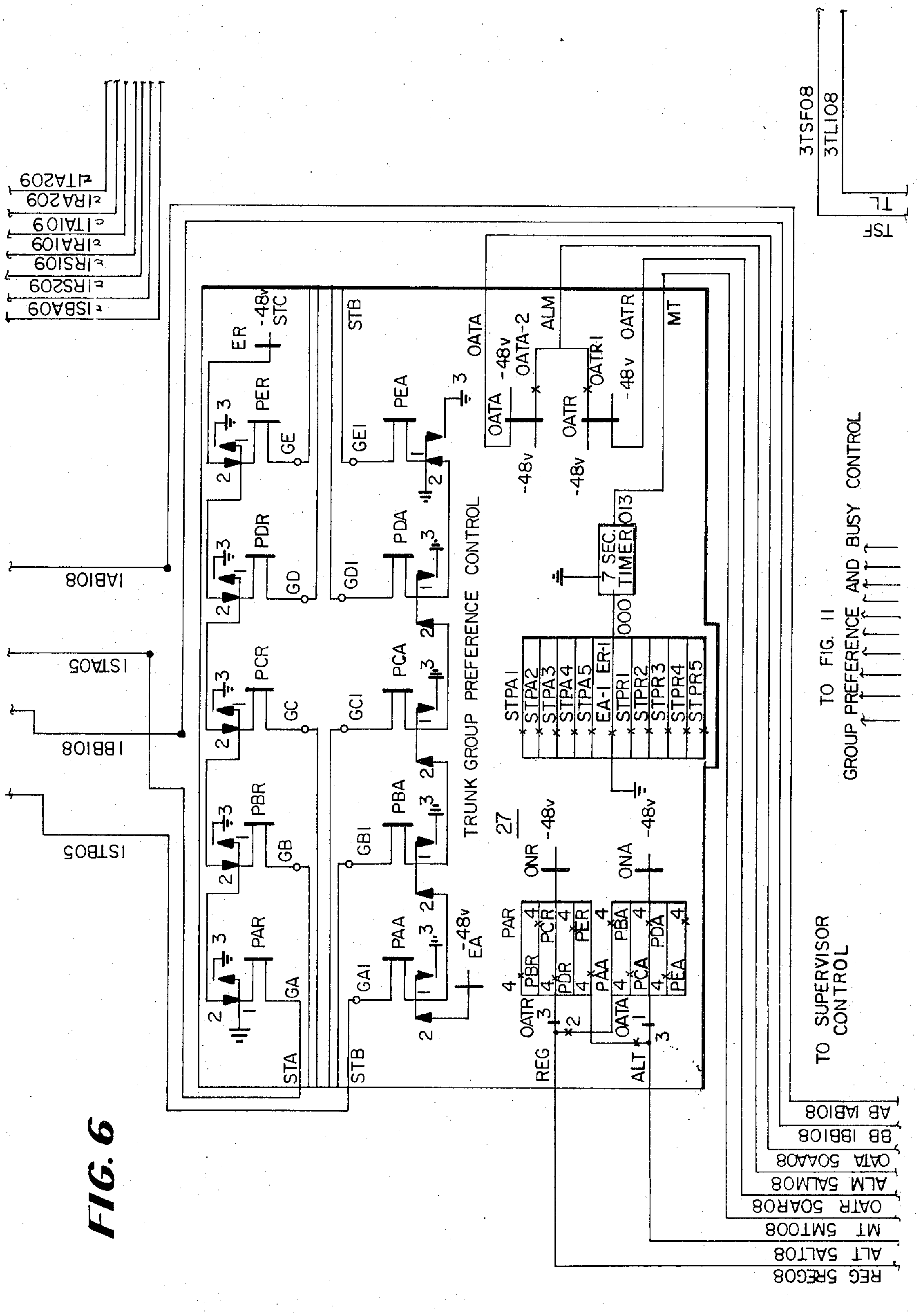
FIG. 6 is a schematic of the trunk group preference control circuit shown at 27 in FIG. 1.
Figure 8:
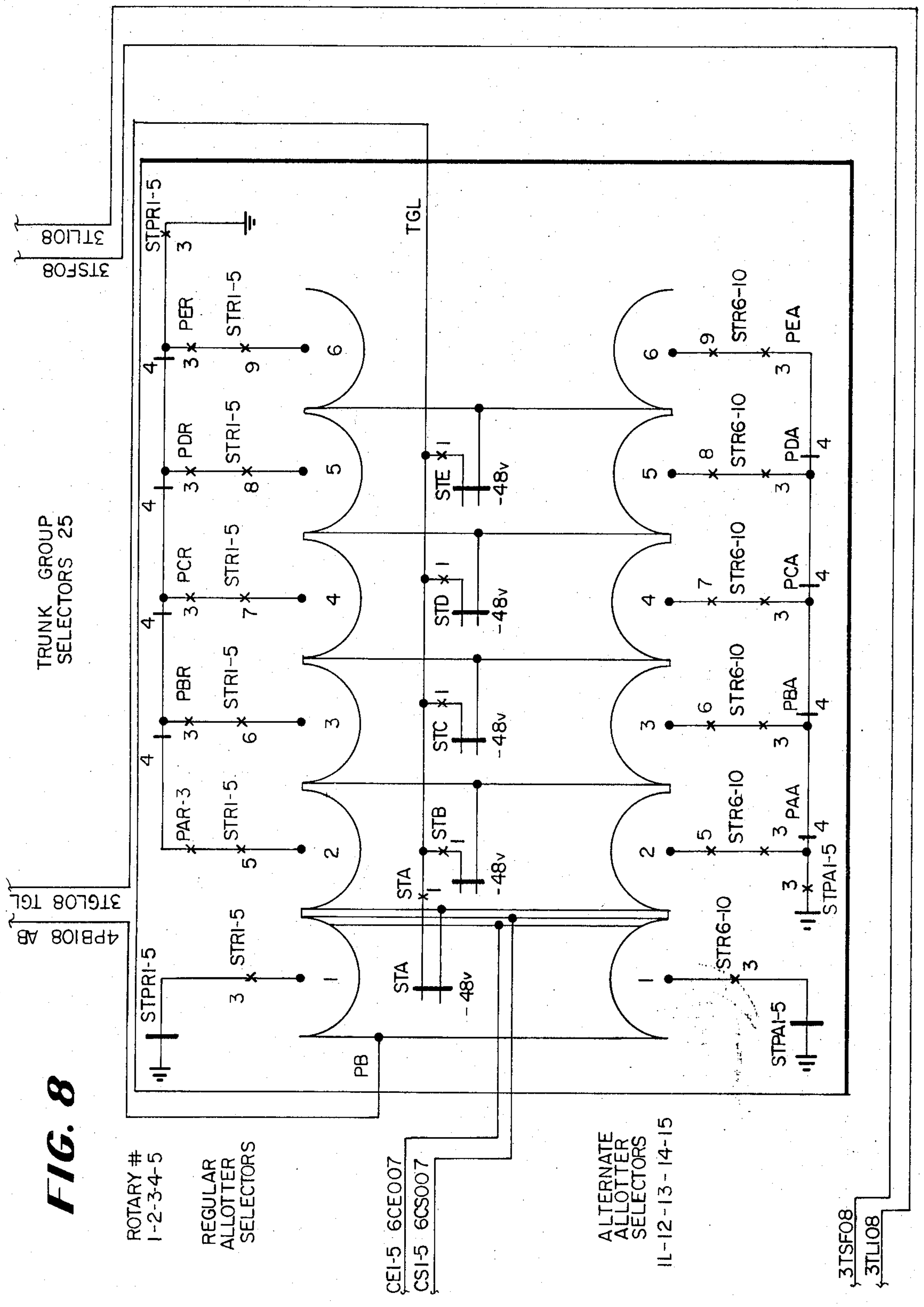
FIG. 8 is a schematic of the trunk group selector circuit shown at 25 in FIG. 1.

Referring back to T.2 — FIG. 6. At the same time the ER releases the ONR relay operates. In FIG. 8 the Manual Transfer Key supplies a ground through the 5REG08 lead through the normally made contact 3 on the OATR relay through contact 4 on the PAR relay to the ONR relay causing it to operate.

REFER TO FIG. 11 — REGULAR POSITION GROUP PREFERENCE AND BUSY CONTROL

A ground is fed through normally made contact 1 of the P1R relay through contact 1 of the ONR relay through normally made contact 2 of the P1R relay to the P1 relay causing it to operate.

REFER TO FIG. 7 — POSITION GROUP SELECTION

There is a ground through contact 2 on the ONR relay through normally made contact 4 on the P1R relay to the STR1 relay. The STR1 relay operates.

REFER TO FIG. 7

There is a ground through normally made contact 3 of the CE1 relay through contact 1 of the STR1 relay through the normally made contact 1 of the STPR1 relay through the normally made contact 1 of the ROTR1 relay to INTR1. The INTR1 now operates stepping Rotary No. 1, one terminal. Ground is now fed through the INTR1 contact 1 to the ROTR1 relay and it operates releasing the ground to the INTR1 relay which releases the ground to the ROTR1 relay. This process continues for each step taken by the rotary. (NOTE: ROTR1 is the motor magnet on the rotary itself).

REFER TO FIG. 8

Figure 4:
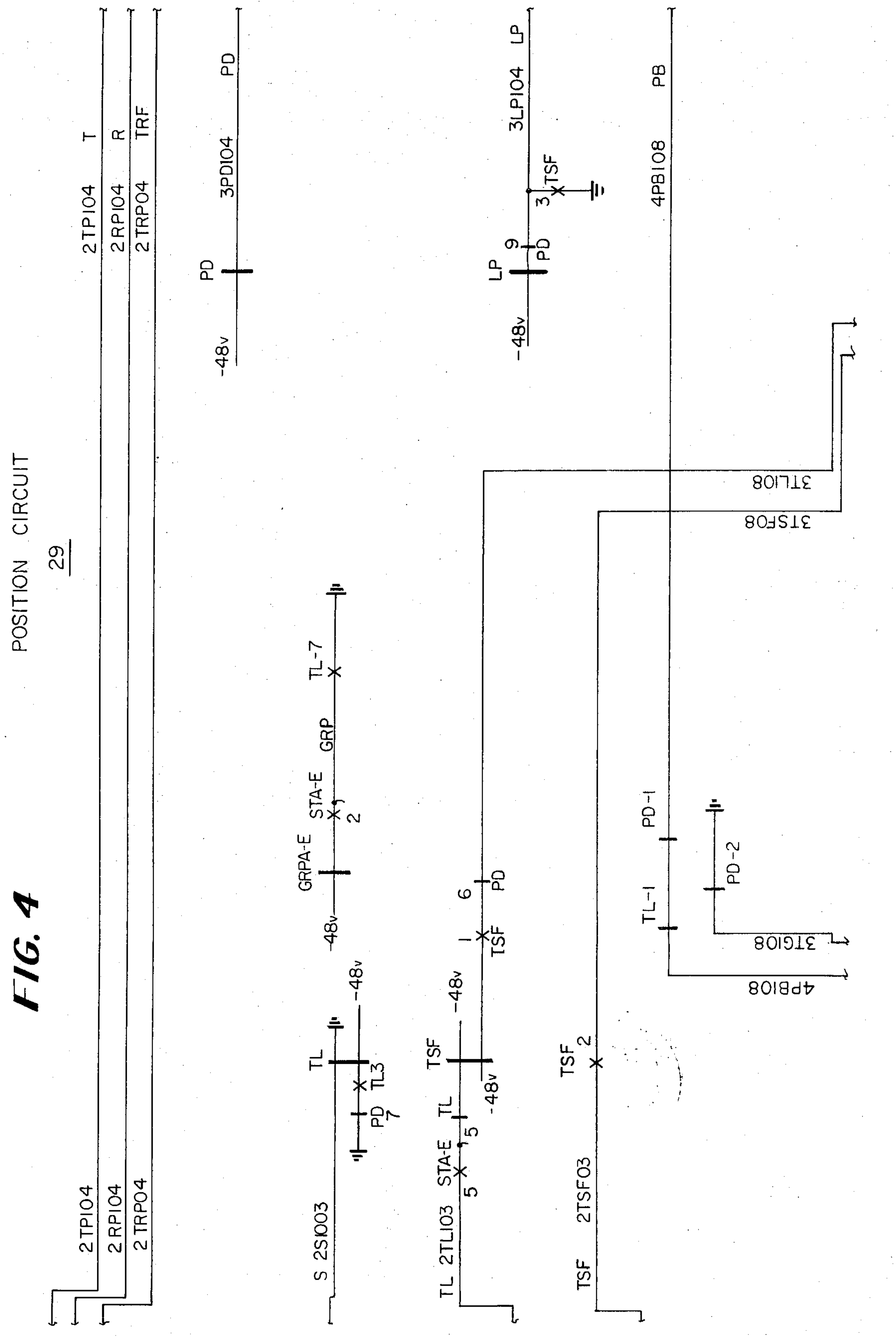
FIG. 4 is a schematic of the position group circuit employed at 29 in FIG 1.
Figure 5:
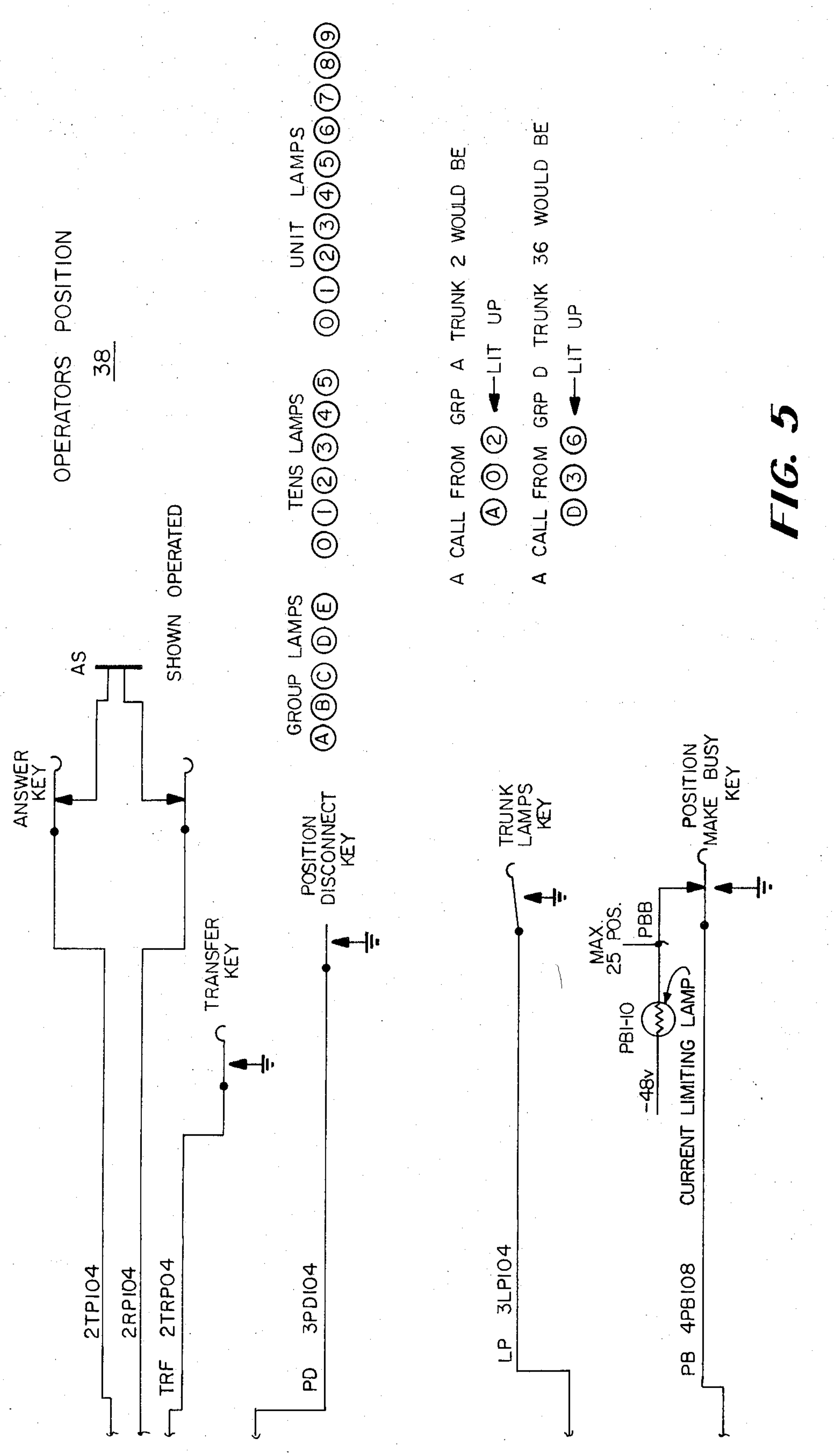
FIG. 5 is a schematic of the operators position shown at 38 in FIG. 1.
Figure 7:
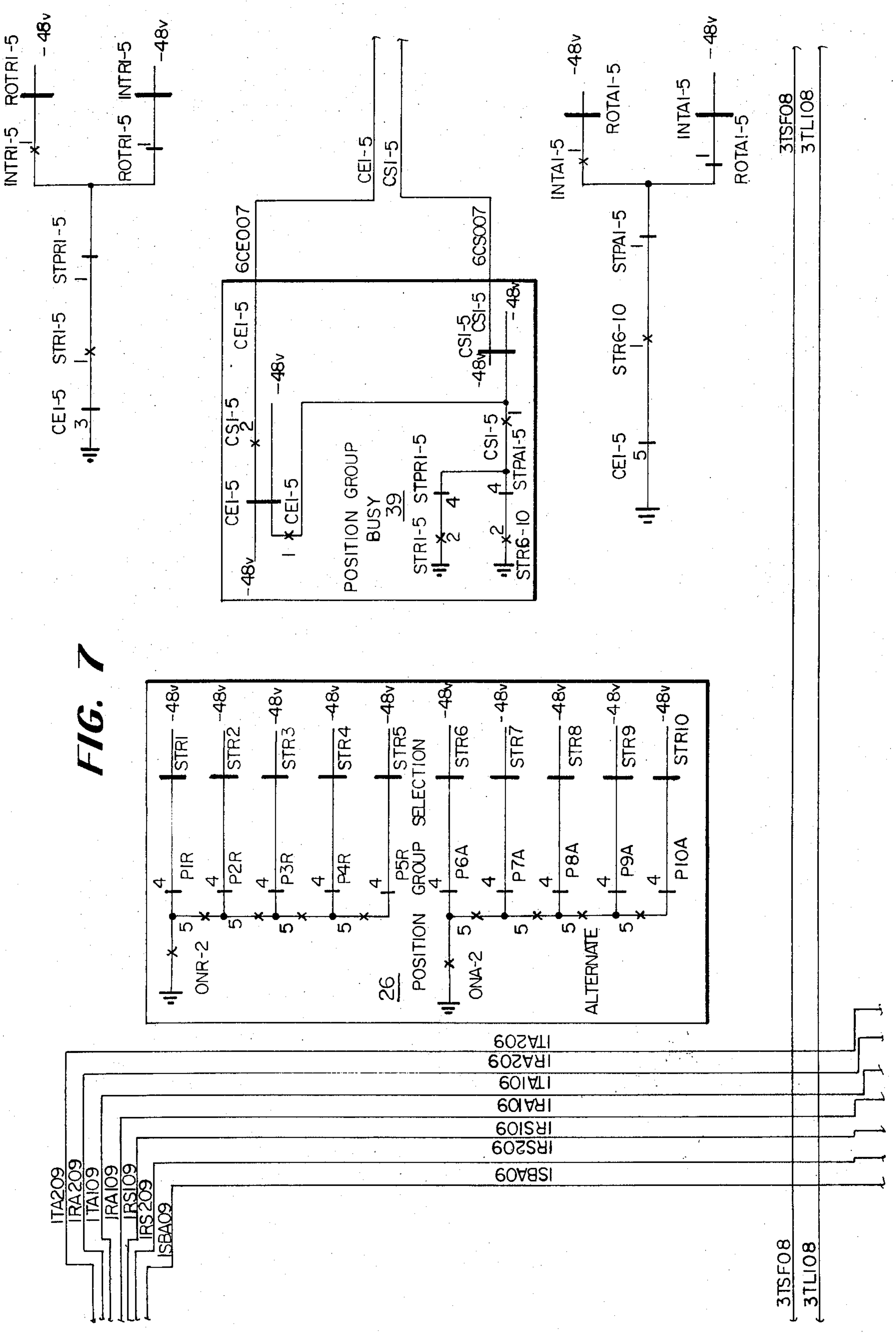
FIG. 7 is a schematic of the position group selector circuit 26 and the position group busy circuit 39 shown in FIG. 1.

In FIG. 5 the 4PB108 lead is normally at a −48 potential through the normally made contacts of the Position Made Busy Key. The 4PB108 lead goes through normally made contact 1 of the PD relay (FIG. 4) through the normally made contact 1 of the TL relay to FIG. 8 where it is applied to terminal 1 of wiper 1 of Rotary No. 1. As rotary 1 hunts, its wiper will contact terminal 1. The −48v will be applied through contact 3 of STR1 to STPR1 relay which will cause the STPR1 relay to operate. In FIG. 7 the ground that was being used to step the Rotary has now been removed by open contact 3 of the STPR1 relay. The rotary ceases to hunt.

REFER TO FIG. 8

There is now a ground from contact 3 of the STPR1 relay through normally made contact 4 of the PER relay through normally made contact 4 of the PDR relay through normally made contact 4 of the PCR relay through normally made contact 4 of the PBR relay through contact 3 of the PAR relay (Refer to T.1) through contact 5 of the STR1 relay to terminal 1 (via the wiper) to the STA relay, operating the STA relay. The STA relay locks through STA contact 1 through the 3TGLO8 lead to FIG. 4 where it goes through normally made contact 2 of the PD relay to ground.

REFER TO FIG. 3 — TRUNK SELECTION

NOTE: At this point the call has arrived to a trunk and the Call Distributor must now match the position to the trunk.

There is a ground through normally made contact 9 of the TL relay through contact 3 of the STA relay through Contact 1 of the ROA relay to the INA relay, operating the INA relay. There is now a ground through contact 1 of the INA relay operating the ROA relay. This breaks the ground to the INA relay — releasing it which in turn releases the ROA relay. (The ROA relay is the motor magnet on the Rotary). This process starts stepping the rotary.

REFER TO FIG. 3

Figure 2:
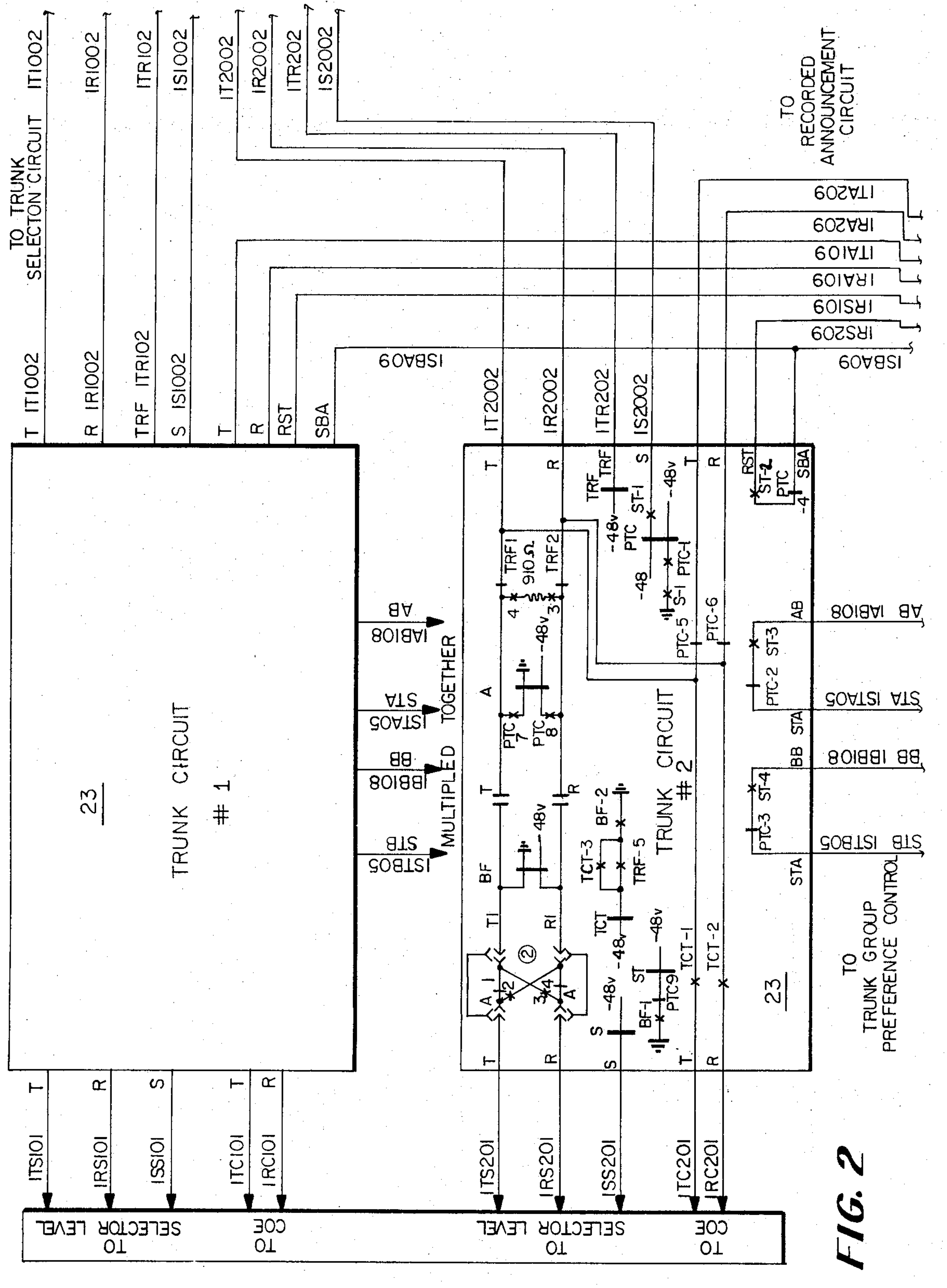
FIG. 2 is a schematic of the trunk group circuits employed in FIG. 1.

In FIG. 2 there is a 1S2002 lead from trunk 2 which is at a −48v potential. The −48v goes through the PTC relay through contact 1 of the ST relay out the 1S2002 lead to FIG. 2 level 1 terminal 50 on the rotary.

As the rotary hunts, the wiper will move across the terminals until it reaches terminal 50. The wiper will then connect to the −48v which will go through the STA contact 7 and out the 2S1003 lead to FIG. 4. Here the 2S1003 lead with the −48v will go through the TL relay causing it to operate. The TL relay will then lock up through TL contact 3 through PD contact 7 to ground.

Figure 3:
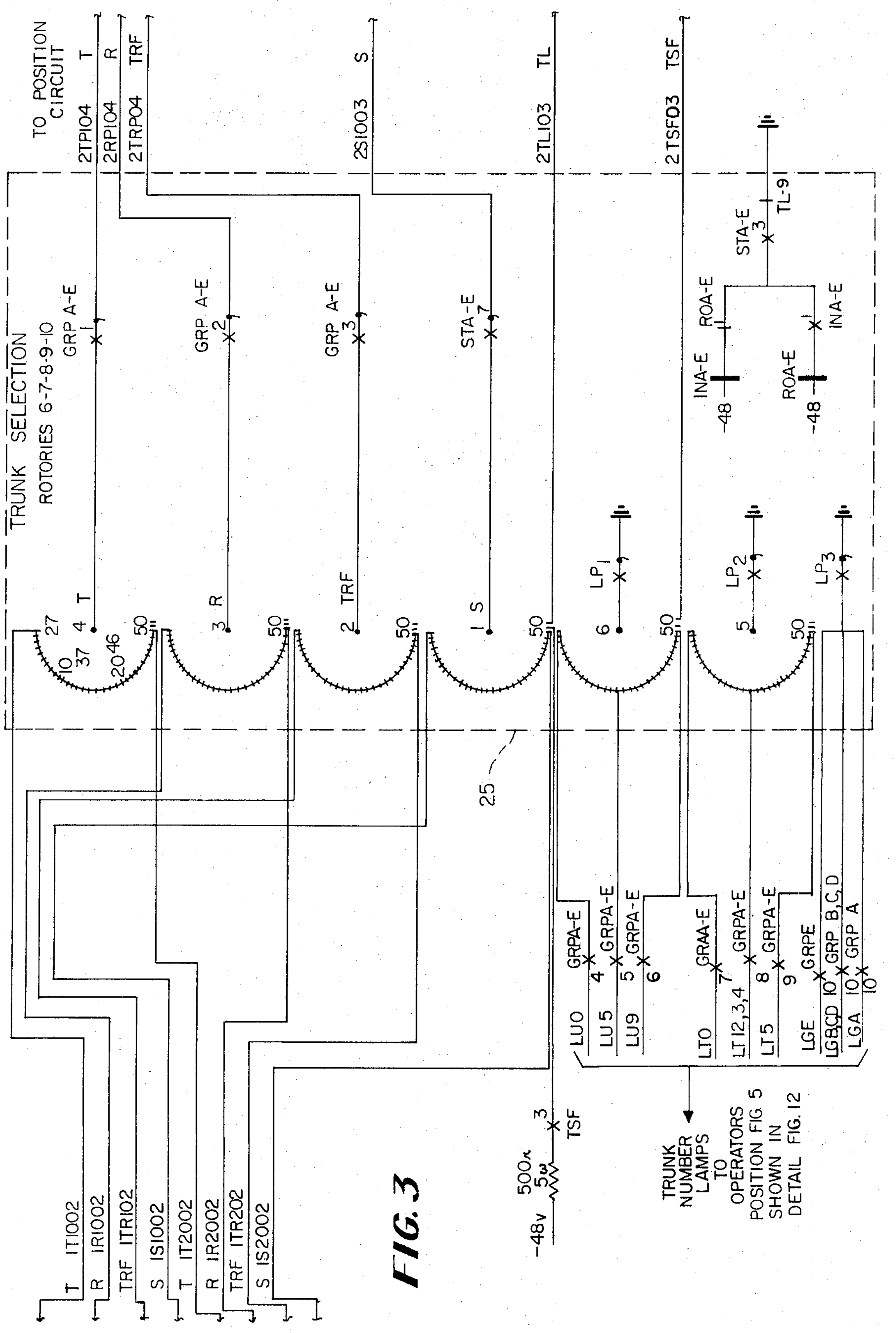
FIG. 3 is a schematic of the trunk group selector circuit shown at 25 in FIG. 1.

In FIG. 3 the operation of the TL relay will open TL contact 9 and the rotary will stop hunting.

At the same time, TL relay operates the PTC relay in FIG. 2 will operate through the same battery to ground circuit and the PTC relay will also lock through its own contacts through PTC contact 1 and S relay contact 1 to ground.

REFER TO FIG. 4

There is now a ground through TL contact 7 through STA contact 2 to the GRPA relay which now operates. The operation of the TL relay opens the −48v on the 4PB108 lead that was holding STPR1 operated so now STPR1 releases.

REFER TO FIG. 5

The operator now operates her answer key, which closes the circuit to the AS relay through the 2TP104 and 2RP104 lead to the trunk circuit and the A relay in FIG. 2 now operates.

The circuit is from ground thrugh the A relay (FIG. 2) through contact 7 of the PTC relay through normally made contact 1 of the TRF relay out 1T2002 through the rotary (FIG. 3) through the GRPA contact 1 out 2 TP104 through FIG. 4 to the AS relay coil out the other side to the 2RP104 lead through FIG. 3 through the GRPA contact 2 through the rotary through the 1R2002 lead through normally made contact 2 of the TRF relay through contact 8 of the PTC relay through the A coil to ground.

The operator now operates her trunk lamp key and identifies the trunk she is servicing by the lights in FIG. 3 and FIG. 5.

The ground goes through contact 3 of the LP relay through contact 10 of the GRPA relay to a light which lights up LGA.

A ground goes through LP contact 2 through the wiper to terminal 50 through the GRPA contact 9 to a light which lights up 5 designating — 5 tens or 50. A ground goes through LP contact 1 through the wiper to terminal 50 through the GRPA contact 4 to a light which lights up 0. NOTE: Trunk 2 is wired to terminal 50.

Figures 12, 13:
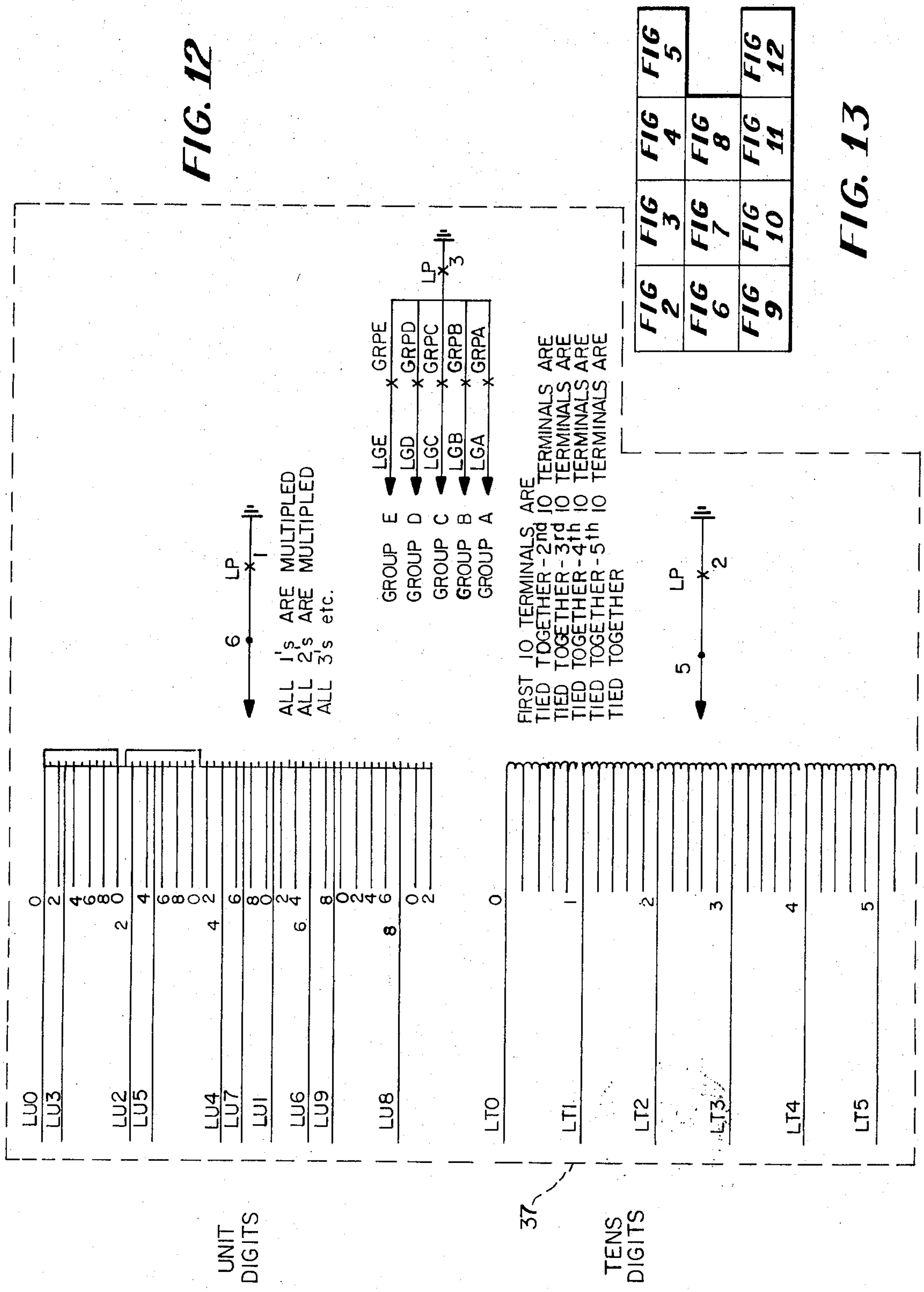
FIG. 12 is a schematic of the trunk identification circuit shown at 37 in FIG. 1.
FIG. 13 is a diagrammatic guide to the interrelationship of FIGS. 2 through 12.

See FIG. 12 for close up diagram of Trunk Number Lamps.

REFER BACK TO T6 — FIG. 2

The ground that operated the ST relay has been opened when the PTC relay operated. PTC contact 9 opened and released ST. Also after the PTC relay operated the circuit which held PAR operated in FIG. 6 opened and released the PAR relay through contact 2 of the PTC relay and contact 3 of the PTC relay in FIG. 2.

When the PAR released the ground is restored to the ER relay and it operates. PAR releasing also released the ONR relay in FIG. 6.

Figure 11:
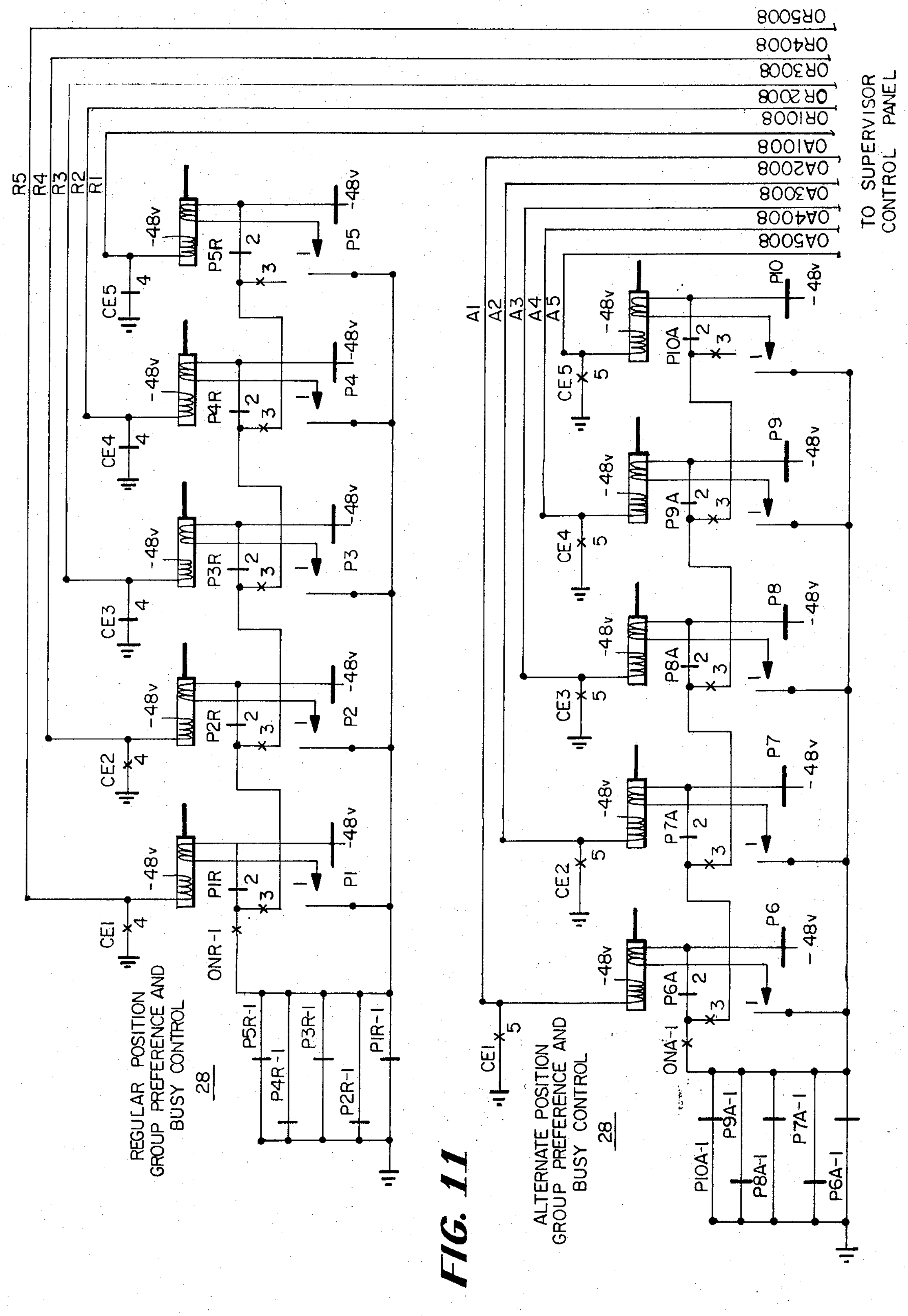
FIG. 11 is a schematic of the position group preference and busy control circuits shown at 28 and 39 respectively in FIG. 1.

In FIG. 11 the releasing of the ONR relay opens ONR contact 1 and P1R now operates through a normally made contact 1 of the P2R relay through contact 1 of the P1 relay through the coil of the P1R relay through the coil of the P1 relay. This path holds both P1R and P1 operated.

The Call Distributor is now ready for another call.

DIAL OUT OR TRANSFER CIRCUIT

FIG. 5

The operator has answered the call and the person calling would like to talk to someone else, Supervisor, Service Department, etc. The operator then operates her transfer key and places a ground on the 2TRP04 lead. The ground on the 2TRP04 lead goes through the rotary in FIG. 3 and goes out the 1TR202 lead to Trunk 2. (This is the trunk she is talking to). The ground on the 1TR202 lead operates the TRF relay. This supplies a ground through contact 2 on the BF relay through contact 5 on the TRF relay to the TCT relay, the TCT relay then operates and locks through the TCT Contact 3.

Contacts 3 and 4 on the TRF relay make and place a 910 OHM resistor across the line to hold the calling party. Contacts 1 and 2 on the TRF relay break to separate the operator form the calling party.

Contacts 1 and 2 on the TCT relay make and the operator is now into the COE out the 1TC201 and 1RC201 leads. The operator may then dial or release her transfer key. This breaks contacts 3 and 4 on the TRF relay which takes the 910 OHM resister back out of the circuit. This also makes contacts 1 and 2 on the TRF relay and the calling party now has access to the COE to dial out or to communicate with the number the operator dialed. The operator may then assist as a third party or operate the position disconnect key and accept another call.

SEIZURE BY INCOMING TRUNK - ALL POSITIONS BUSY

REFER BACK TO T.4, PAGE 9 - FIG. 8

Rotary No. 1 has hunted for a vacant position and has not found any or the STPR1 relay has not operated.

When the wiper on Rotary No. 1 passes over terminal 52 the CS1 relay in FIG. 7 will operate. There will be a ground through the STPR1 relay through the wiper and terminal out the 6CS007 lead to the CS1 relay in FIG. 7. The CS1 relay locks through its own contacts CS1 contact 1 through STPR1-5 normally made contact 4 through contact 2 in the STR1 relay to ground. This does not stop the rotary so the rotary continues to hunt. When the wiper crosses over terminal 51 a ground comes through STPR1 relay through the STR1 contact 3 through the wiper to the terminal 51 through the 6CE007 lead through CS1 contact 2 to the CE1 relay. The CE1 relay operates which breaks the ground which runs the rotary. (CE1 contact 3) and the rotary stops. On FIG. 11 P1R will now operate through contact 4 on the CE1 relay to ground. In FIG. 7, since the ONR relay is operated, the ground will go through contact 4 of the P2R relay to STR2. STR2 will operate and Rotary 2 will start to hunt. It will continue to hunt until CS2 and CE2 operate then Rotary No. 3 will hunt, etc. This process will continue until a position becomes available. Then the call continues through the distributor beginning at T.4-1 the normal manner.

WORK TIME OUT

Figure 9:
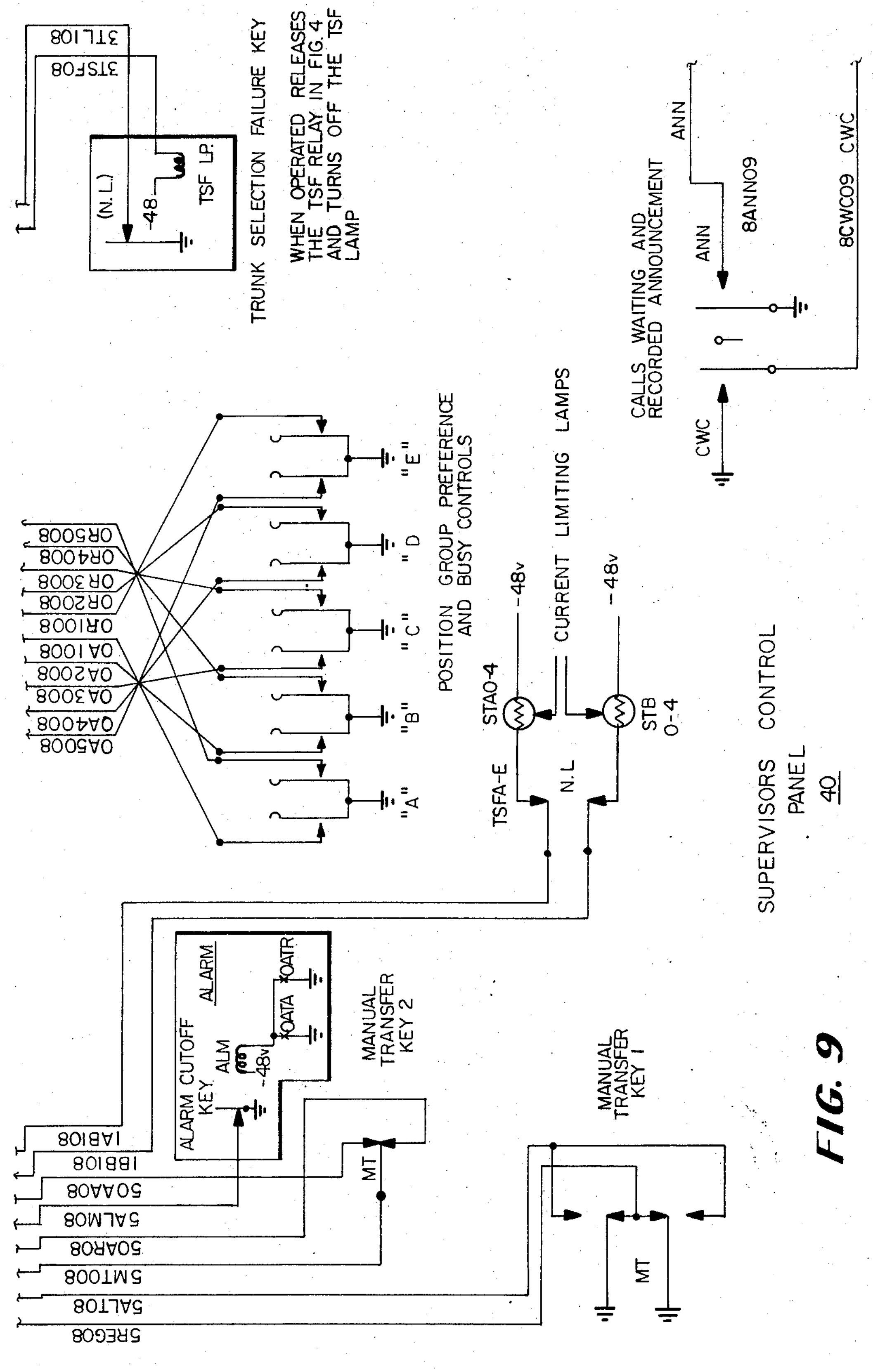
FIG. 9 is a schematic of the supervisors control panel shown at 40 in FIG. 1.

REFER TO FIGS. 6 and 9

The seven second time has no output at 013 if it is reset within 7 seconds by a ground placed at 000. If after seven seconds a ground has not been placed at 000, then there will be a ground at 013.

The way the circuit is designed is that as long as any of the operations are completed within seven seconds the timer will not activate. In a condition of no calls waiting to be serviced EA and ER relays will both be operated. This will supply a ground through EA contact 1 through ER contact 1 to the seven second timer holding it cut off. As soon as a call arrives, the EA and ER relays release (Refer to T.2). From this time on at least one of the following relays must operate every seven seconds to keep the timer off: STPA1, STPA2, STPA3, STPA4, STPA5, STPR1, STPR2, STPR3, STPR4, STPR5. These relays are located in FIG. 8, Regular and Alternate Alloter Selectors. So, if a rotary or rotaries fail to find a position in seven seconds the timer activates.

When the timer activates a ground is fed through the 5MT008 lead to FIG. 9 through the manual transfer key back through 50AR08 and 50AA08 to FIG. 6 and the OATA and OATR relays. They will both operate. In FIG. 9 this will sound the alarm. In FIG. 6 this will place the ground normally at 5REG08 through contact 2 of the OATR relay and on the left hand side of PAA Contact 4.

PAA would be operated from a call in the trunk, thus the ground would go through PAA contact 4 to the 0NA relay and the 0NA relay would operate, placing the Call Distributor in the alternate circuit position.

The calls are then distributed using the Alternate Position Circuits. The alternate circuits work the same as the regular circuits.

COMPLETION THROUGH ALTERNATE SWITCHING PATH AFTER PRIMARY SWITCHING PATH FAILURE

START FROM T.2, PAGE 7

The PAR and PAA relays operate and release the ER and EA relays respectively as explained in T.2, but due to system failure the call distributor switched to the laternate or back up system on the last call. Starting at FIG. 9 at the Manual Transfer Key there is a ground through the 5REG08 lead through now made contact 2 of the OATR relay through contact 4 of the PAA relay to the ONA relay. The ONA relay then operates.

In FIG. 11 Alternate Position Group Preference and Busy Control. There is a ground through normally made contact 1 of the P6A relay through now made contact 1 of the ONA relay through normally made contact 2 of the P6A relay through the P6 relay. The P6 relay operates.

REFER TO FIG. 7 - POSITION GROUP SELECTION ALTERNATE.

There is a ground fed through the now made contact 2 of the ONA relay through the normally made contact 4 of the P6A relay through the STR6 relay. This operates the STR6 relay.

There is now a ground through normally made contact 5 of the CE1 relay through now made contact 1 of the STR6 relay through normally made contact 1 of the STPA1 relay through normally made contact 1 of the ROTR1 relay to the INTA1 relay. This causes the INTA1 relay to operate. Then the ground is fed through the now made contact 1 of the INTA1 relay to the ROTA1 relay, which then operates which releases the INTA1 relay which releases the ROTA1 relay. Thus stepping Rotary No. 11 in FIG. 8.

In FIG. 8 the 4PB108 lead is normally placed at a −48v potential through normally made contacts of the Position Make Busy Key. The 4PB108 leas goes through normally made contact 1 of the PD relay (FIG. 4) through the normally made contact 1 of the TL relay to FIG. 8 where it is applied to terminal 1 of wiper 1 of rotary No. 11. As rotary No. 11 hunts, its wiper will contact terminal 1. The −48v will be applied through contact 3 of the STR6 relay to the STPA1 relay. STPA1 will operate. In FIG. 6 the ground that was being used to step the rotary has now been removed by open contact 1 of the STPA1 relay. The rotary ceases to hunt.

There is now a ground placed through contact 3 of the STPA1 relay through contact 3 of the PAA relay through contact 5 of the STR6 relay through wiper 2 out terminal 1 to the STA relay. The STA relay operates. The rest of the circuit description is the same resuming at T.4-2, Page 10.

CALLS WAITING

In FIG. 9 the Supervisor manually operates the Call Waiting and Recorded Announcement Key to the CWC position. This places a ground on the 8CWC09 lead to FIG. 10 and the CWC relay. The CWC relay operates.

There is a ground through the now made contact 1 of the CWC relay to the SAN relay. The SAN relay now operates.

The rotary is setting with wiper 1 on terminal 52. A ground goes through a now made contact 1 of the SAN relay through the normally made contact 1 of the STA and STD relays through normally made contact 1 of the ROT relay to the INT relay. This operates the INT relay which places a ground through now made contact 1 of the INT relay to the ROT relay. The ROT relay operates and releases the ground operating the INT relay which in turn releases the ground operating the INT relay which in turn releases the ROT relay thus stepping the Rotary Switch 1 terminal. The rotary begins to run. When the wiper crosses terminal 1 the STA relay operates and locks up through now made STA contact 2 through made contact 2 of the SAN relay to ground.

When wiper 1 crosses terminal 52, the ground is placed from the wiper through the now made contact 3 of the STA relay to the STO relay operating the STO relay. The STO relay locks up through now made contact 2 of the SAN relay to ground. The rotary stops because the ground that was operating it through the STA and STO contacts 1 has now been broken with the operation of the STA and STO relays. The cycle is complete.

Meanwhile, while the rotary was stepping the number of calls waiting were being counted.

There is a −48 volts fed through a current lamp out 1SBA09 lead to the first 50 trunks. Refer to FIG. 2. The −48v arrives via the 1SBA09 lead and goes through normally amde contact 4 of the PTC relay through made contact 2 of the ST relay back along the 1RS209 to terminal 2 on Wiper 3, FIG. 10.

As long as there is a call in the trunk that has not been answered, the ST contact is made. If the call is answered, then PTC contact 4 will be open.

So, there are 50 trunks on wiper 3 and 50 trunks on wiper 5. This circuit is for 100 trunks, for a full 250 trunk load 3 of these identical circuits would be needed.

Each trunk that is waiting to be serviced has a −48v or the terminal on the back of the rotary. As the rotary sweeps around when a −48v is on a terminal it is fed through the wiper through made contact 4 on the STA relay through made contact 2 on the CWC relay to a CW relay — which counts up one every time a pulse hits it. With a quick glance the supervisor can tell how many calls are waiting to be serviced.

Figure 10:
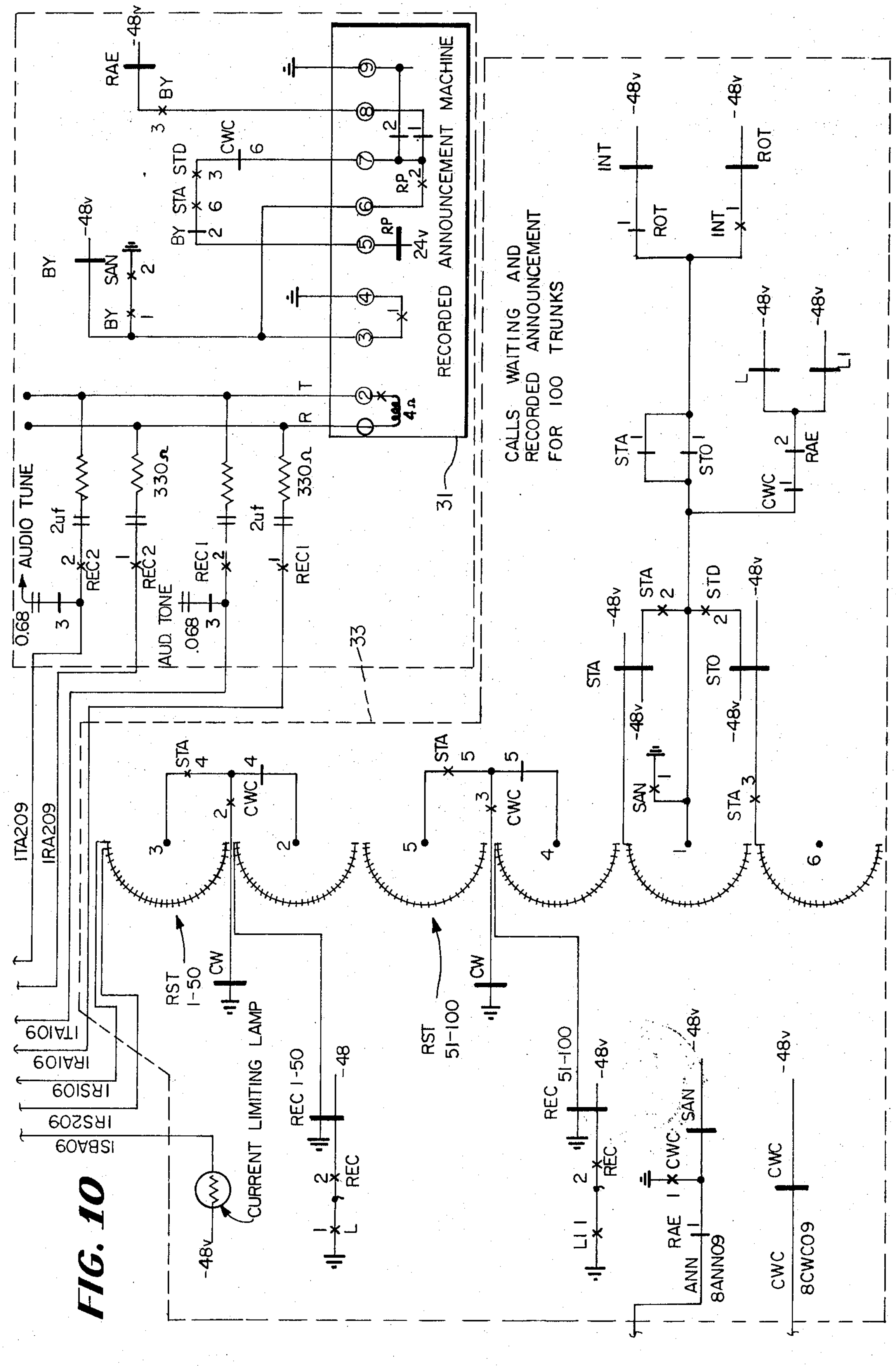
FIG. 10 is a schematic of the calls waiting circuit and recorded announcement machine and control circuit therefor shown at 33 and 31 respectively in FIG. 1.

The supervisor then releases the Calls Waiting and Recorded Announcement Key in FIG. 9 and the CWC relay in FIG. 10 releases which releases the SAN relay which breaks contacts on the SAN relay which releases the STA and STO relays.

The Calls Waiting Circuit is now ready to count again as soon as the counters are reset.

THE RECORDED ANNOUNCEMENT FIG. 10

The Supervisor after seeing how many calls are waiting decides to broadcast a recorded announcement. He then places the Calls Waiting and Recorded Announcement Key in FIG. 9 in the ANN Position.

This places a ground through normally made contact 1 of the RAE relay to the SAN relay. The SAN relay operates. This places a ground through the now made contact 1 of the SAN relay through the normally made contact 1 of the CWC relay through the normally made contact 2 of the RAE relay to L and L1 relays. Both of these relays operate.

Resume at T.1, Page 19. Same procedure happens until T.2, Page 21.

Each trunk that has a call waiting to be serviced has a −48v on the terminal of the rotary. As the rotary sweeps around a −48v comes from the terminal through the Wiper No. 1 or No. 5 through now made contact 4 of the STA relay through normally made contact 4 of the CWC relay to wiper No. 2 or No. 4 where it is fed to the terminals.

For each trunk there is an REC relay. The −48v comes through the wiper out the terminal to the REC relay. The REC relay then operates. The REC relay locks through REC contact 2 through contact 1 on the L relay to ground. In brief, the −48v from Trunk 1 goes to terminal 1 through wiper 3 to wiper 2 through terminal 1 to REC-1.

At the end of the revolution STO operates as explained on page 20 and the rotary stops.

There is now a ground from 9 on the recorded announcement machine through normally made contacts of the limit switch 1 out terminal 7 on the Recorded Announcement Machine through normally made contact 6 of the CWC relay through now made contact 3 of the STO relay through now made contact 6 of the STA relay through normally made contact 2 of the BY relay to terminal 5 on the Recorded Announcement Machine to the RP relay. The RP relay operates.

There is now a ground on terminal 4 of the Recorded Announcement Machine through now made contact 1 of the RP relay to terminal 3 on the Recorded Announcement Machine to the BY relay. The BY relay then operates. The BY relay locks up through BY relay contact 1 and SAN contact 2 to ground. BY relay operating also releases the RP relay be breaking the holding ground at BY relay contact 2.

The announcement is now being broadcast through the T and R lead through 300 OHM resistors and 2 $\mu$fd. capacitors through the REC contacts 1 and 2 through the 1TA209 and 1RA209 lead to FIG. 2 through the normally made contacts 5 and 6 on the PTC relay through normally made contact 1 and 2 on the TRF relay through antoerh 2 $\mu$fd. capacitor to all waiting calls.

The REC relays are held operated for the trunks that need the announcement. Should a call be serviced while a trunk in FIG. 2 is getting an announcement the PTC relay upon operating will open its contacts 5 and 6 on the T and R leads. Thus, removing that trunk from the Recorded Announcement Machine.

All waiting trunks are serviced simultaniously by the Recorded Announcement.

At the end of the announcement Limit Switch 2 makes and RAE operates through BY contact 3 to terminal 8 on the Recorded Announcement Machine through the Limit Switch 2 through Limit Switch 1 to terminal 9 and ground.

The operation of the RAE relay opens RAE contact 1 and releases the SAN relay. The release of the SAN relay releases STA and STO relays through contact 1 to ground. RAE operating also opens RAE contact 2 which releases L and L1.

The release of L and L1 releases all the REC relays. Release of the SAN relay releases the BY relay which release the RAE relay which returns the Record Announcement Circuit to normal.

Any time the Supervisor releases the key the Record Announcement stops, but until he does so it continues to cycle.

SUPERVISOR CONTROL PANEL 40

POSITION GROUP PREFERENCE AND BUSY CONTROLS, FIGS. 11 AND 9

The Supervisor by operating the appropriate position groups busy key can busy any of the group of position on FIG. 9. By operating Key A she busies position Group A. By operation of Key D she busies position Group B, etc. All traffic is automatically transferred to the position groups that are not busied out.

The Supervisor operates the A key for example. A ground is fed out the 0A1008 and 0R5008 leads to FIG. 11. The ground on the 0A1008 lead goes to the P6A relay and operates it. The ground of the 0R5008 lead goes to the P1R relay and holds it operated. This busies Position Group A.

Refer back to page 15 for explanation of how the operation of the P1R relay busies position Group A.

TRUNK SELECTION FAILURE KEY, FIG. 9.

This key is used in case an operator position is unable to find a calling trunk. Refer to FIG. 3. For background information, refer to T.4-2, Page 10.

The rotary on FIG. 3 is hunting for the trunk but has not been able to find it due to a fault in the Position equipment or trunk. When wiper 1 crosses terminal 52 the TSF relay in FIG. 3 will operate from a ground from the TL relay through now made contact 7 on the STA relay through wiper 1 out terminal 52 through now made contact 5 on the STA relay through normally made contacts 5 on the TL relay to the TSF relay.

The TSF relay then locks up through TSF contact 1 through normally made contact 6 on the PD relay out lead 3TL108 to FIG. 9 where it goes through a normally made key to ground. If on the next revolution the trunk has not been found when the wiper crosses terminal 51 a −48v will be fed through a 500 OHM resistor through made contact 3 on the TSF relay to the wiper through contact 7 on the STA relay to the TL relay. The TL relay will then operate and stop the rotary. The TSF Lamp will light in the Supervisor's control panel. The light will light from ground through now made contact 1 of its LP relay through wiper 6 out terminal 51 through the 2TSF03 lead to FIG. 9 where it goes through the TSF Lamp to −48v.

The operation of the TSF Key releases the TSF relay and turns the TSF lamp off.

By operation the TSFA-E key in FIG. 9 the position will be dismissed and another position will try to find the trunk. This insures that a permanently operated trunk relay cannot cause service to be denied to other trunks. There is a ground through TSF contact 3 through normally made contact 9 on the PD relay at the LP relay. This operates the LP relay and identifies which group the trunk is in that cannot be found. (LP relay turns on the Trunk Identification Lamps) See FIGS. 3, 4 and 5.

SUPERVISOR CONTROL PANEL - MANUAL ALTERNATE POSITION SWITCHOVER

In a normal condition the Supervisor can change to the Alternate Position Circuits by operating manual transfer key No. 1. This places the ground on the 5ALT08 lead in FIG. 6, this ground goes through the normally made contact 1 of the OATA relay and is on the left side of PAA contact 4. When a call arrives and the PAA-PAE relays operate then the ONA relay will operate using all of the alternate circuits.

Refer to T.1, Page 17 for detailed description of the Alternatie Circuit Workings.

PLACING THE CALL DISTRIBUTOR BANK INTO REGULAR POSITION CIRCUIT AFTER AUTOMATIC SWITCHOVER HAS OCCURED.

If the call distributor has gone into the alternate position due to a failure of one of the circuits, the Supervisor can, after the trouble has been repaired, switch the distributor back on to the regular circuits by operating Manual Transfer Key 2. This removes the timer from the circuit. By also operating the alarm cutoff key the OATA relay will release placing the call distributor into the regular mode.

When OATR and OATA have been released, the alarm will cut off.

GENERAL NOTES

There are five trunk selection rotaries for each position, if each position is to have access to 250 trunks.

The PAR-PER and PAA-PEA determine the group the trunk is in which determines which of the STA-STE relays pull which determine which trunk Selection Rotary turns which determines which GRPA-E relay operates which determines which lights appear on the operators trunk identification lamps.

Connecting leads are six and seven digit numbers:

1st and 2nd digit — originating from a seven digit number, 1st for a six digit number, figure number 3rd, 4th and 5th digits — lead initials 6th and 7th digits — figure number the lead is going to.

These have alternate circuits: Trunk Group Preference Control Circuit, Position Group Selection Circuit, Alloter Selectors, Position Group Preference and Busy Control.

Relays contained only on Trunk Circuits - 1 trunk 1. BF 2. A 3. S 4. TCT 5. ST 6. TRF 7. PTC 8. REC Relay contained only on position circuits - 1 position. 1. TL 2. GRPA 3. GRPB 4. GRPC 5. CRPD 6. GRPE 7. PD 8. LP 9. TSF 10. STA 11. STB 12. STC 13. STD 14. STE 15. AS 16. INA 17. INB 18. INC 19. IND 20, INE For 250 trunks three Recorded Announcement Machines are needed.

The Rotaries step approximately 30 terminals per second.

Service to a call is approximately 200 milli-seconds, resulting in about 300 call a minute maximum and 3 call a minute minimum.

Maximum number of positions is 250 divided into groups of 50.

In FIG. 2, Trunk 2 there is an option labeled 2. This is necessary in some systems to signal in the selector level that the call has been seized. When the A relay operates by the answering of the operator the T1 lead goes through contact 3 on the A relay to the R lead. The R1 lead goes through contact 2 on the A relay to the T lead. This provides reversal of the T and R leads to be used as a signal back at the Selector Level.

When the alarm is operated it will continue to operate until the trouble has been fixed and the Call Distributor is placed back into the regular mode.

An operator can busy her positions by: FIG. 5 Operating her position make busy key which places the 4PB108 lead at ground potential. In FIG. 8 this will come through the 4PB108 lead to wiper 1 of the rotary. Since STPR1 needs a −48v to operate it a ground on the 4PB108 lead will not operate the STPR1 coil so the rotary will continue hunting.

What we claim is:

1. For use with a call answering and allotting transfer system having a plurality of incoming trunk lines at least one trunk group, and a plurality of operator serviced position circuits and at least one position group; a trunk and position preference and selector circuit comprising:

a. electrically conductive means in circuit with said trunk lines for detecting a calling signal on a trunk, b. means in circuit with said trunk lines for determining which of said trunk groups has an incoming calling trunk, c. search means adapted to be conductively placed in said position circuit to initiate search of said trunk group to locate an incoming calling trunk, d. conductive means adapted to be placed in circuit with said position group to connect a selected position to said incoming calling trunk, e. a recorded announcement machine adapted to be placed in circuit with each incoming trunk line, f. recorded announcement circuits each being connectable with a recorded announcement machine and in circuit to be connected to the trunk lines, g. and control means in circuit with said trunk lines and said recorded announcement machine to connect incoming trunk calls to said recorded announcement circuits when they have not been serviced by operator position circuits within a predetermined time period of control.

2. A system as claimed in claim 1 wherein said control means comprises timer means in circuit between said trunk circuits and operator position circuits and said recorded announcement circuit to connect said recorded announcement machine to said calling trunk when no operator positions are available after the timer means has timed out.

* * * * *